– 
United States Patent Office 3,115,442
Patented Dec. 24, 1963

3,115,442
MICROBIAL PRODUCTION OF 10-HYDROXY-STEARIC ACID
Lowell L. Wallen, Peoria, Ill., assignor to the United States of America as represented by the Secretary of Agriculture
No Drawing. Filed Apr. 26, 1963, Ser. No. 276,136
2 Claims. (Cl. 195—30)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a novel method of producing the known compound 10-hydroxystearic acid.

More particularly, this invention relates to the unobvious discovery that 10-hydroxystearic acid can be directly formed in a microbiological fermentation of oleic acid.

Still more particularly this invention relates to the unobvious discovery that a particular bacterial pseudomonad under certain critical fermentation conditions microbiologically hydrates oleic acid at the 9,10-double bond thereof and thereby produces 10-hydroxystearic acid without also producing isomers that could necessitate difficult separation procedures.

The compound 10-hydroxystearic acid has known utility as a starting material for the preparation of a wide variety of esters and other derivatives used as plasticizers, lubricants, release agents, etc. Industrially, 10-hydroxystearic acid is now prepared by oxidizing oleic acid to 9,10-epoxystearic acid, and hydrogenating the epoxy acid (which results in the formation of a virtually inseparable mixture of the 9- and 10-hydroxy isomers).

Oleic acid has many industrial uses, but its increasing availability as a byproduct from the vegetable oil industries depresses its industrial market price.

Accordingly, the principal object of my invention is the discovery of a previously unknown method of converting oleic acid to a more valuable product, namely 10-hydroxystearic acid. Another object is the discovery of a microorganism which successfully converts the double bond of a mono-unsaturated vegetable fatty acid to a single bond with an adjacent oxygen function.

In accordance with the above objects I have now discovered that aerobic fermentations of oleic acid with a bacterium apparently belonging to the genus Pseudomonas and more particularly the pseudomonad designated as NRRL B-2994 provides in effect an enzymatic or metabolic addition of one molecule of water to the 9,10-double bond of the oleic acid and thus converts the unsaturated acid to 10-hydroxystearic acid in flask fermentation yields of 14 percent even under the presumably less than optimal conditions of a laboratory flask fermentation. The substitution of linoleic acid for oleic acid resulted in extensive auto-oxidation and acid fragmentation rather than only the directed addition of a hydroxyl group and a hydrogen atom, thus resulting in a mixture of undefined composition. Nevertheless, it is contemplated that the pseudomonad NRRL B-2994 may also be able to similarly hydrate isomers of oleic acid such as elaidic acid or homologues such as erucic acid to form related hydroxy-substituted fatty acids.

Initial shake flask fermentations of oleic acid by NRRL B-2994 in conventionally neutral to distinctly acidic media containing the usually required trace metals, i.e., molybdenum, copper, manganese, and zinc gave disappointingly low conversion yields amounting to only about 2 percent based on the available oleic acid.

Despite the well known fact that most microorganisms require a neutral to distinctly acid pH (see pages 17–18 of the "Difco Manual," 9th ed. publ. 1953 by Difco Laboratories, Inc., Detroit), I repeated the experiments after omitting the trace metals from the fermentation medium and adding alkali to provide a distinctly alkaline pH of 8.0. An unpredictable and highly unexpected seven-fold increase in yield to a value of 14 percent was obtained after 48 hours of fermentation. The desired conversion product was obtained from a diethyl ether extract of the strong acid-terminated fermentation (6 N $H_2SO_4$ to pH 1.6).

Identification of the pure 10-hydroxystearic acid obtained after selective crystallization from petroleum ether was established by paper chromatography, combustion analysis, derivatization with diazomethane, conversion to 10-ketostearic acid for comparing the melting point with those of authentic samples of 7-ketostearic acid and 10-ketostearic acid, and by spectrometric analysis to establish the position of the hydroxyl group.

Although it is appreciated that industrial production in large fermentors undoubtedly will require some alteration of fermentation conditions such as aeration, temperature, pH, fermentation medium, and length of fermentation, it is believed that such simple adjustments would be within the expected abilities of one skilled in the art.

The following illustrative example is intended to more fully teach the operation of my invention.

Example 1

A medium was prepared containing the following ingredients in parts by weight:

| | |
|---|---:|
| Commercial yeast extract | 0.5 |
| Potassium acid phosphate (monobasic) | 0.4 |
| Magnesium sulfate heptahydrate | 0.05 |
| Distilled water | 100.0 |

The pH was adjusted to a value of 8.0 with potassium hydroxide, and a 50 ml. aliquot of the above medium was placed in each of a series of 300 ml. Erlenmeyer flasks, which were then sterilized by autoclaving, and the medium in each inoculated by a single loop transfer of cells from a growing culture of NRRL B-2994. The cells in the freshly inoculated medium were allowed to proliferate for 24 hours before adding 0.5 g. of oleic acid substrate and 0.5 ml. of a 2 percent solution of a nonionic surfactant ("Triton X-100") to each flask. The flasks, maintained at 25° C., were then shaken for 48 hours on a Gump rotary shaker. Then the fermentations were terminated by adding sufficient 6 N $H_2SO_4$ to provide a pH of 1.6, and the thereby freed fatty acids were extracted continuously with diethyl ether for 24 hours in a liquid-liquid extraction apparatus. The ether solution containing the 10-hydroxystearic acid and the unconverted oleic acid was freed of water with anhydrous sodium sulfate, and the ether was steam-evaporated under a stream of nitrogen. The 10-hydroxystearic acid (0.7 gm. representing a 14 percent yield) was separated from residual oleic acid by selective crystallization at −15° C. in petroleum ether (B.P. 42–45° C.). The 10-hydroxy stearic acid thus obtained melted at 86.0 to 86.5° C. after two recrystallizations from petroleum ether or ethyl acetate.

It is pointed out that although the fermentation period may be extended beyond the 48 hours, the yields are not increased thereby. On the contrary, if the fermentation is markedly prolonged beyond 48 hours, there is a progressive loss of the already produced 10-hydroxystearic acid, even to the vanishing point.

There would be little or no possibility of commercializing my invention if the organism could not tolerate oleic acid concentrations higher than the experimentally employed 0.5 percent. However, I have subjected NRRL B-2994 to oleic acid in concentrations as great as 5 percent and have determined that concentrations of oleic acid as high as 5 percent are completely non-toxic to growing cultures of NRRL B-2994, and there is no indication that still higher concentrations than 5 percent would be toxic per se. It is therefore likely that one could successfully employ oleic acid concentrations of 5 percent or more in efficient industrial fermentors and obtain yields substantially exceeding the presently described 14 percent. It is also possible that better yields would be obtained if a larger amount of inoculum were employed.

Having disclosed my invention, I claim:

1. A process for microbiologically producing 10-hydroxystearic acid comprising adding oleic acid and a trace amount of a non-ionic surfactant to a proliferating 24 hour culture of the pseudomonad NRRL B-2994 in a medium consisting of per 100 parts by weight of distilled water, 0.5 part commercial yeast extract, 0.4 part $KH_2PO_4$, 0.05 part $MgSO_4 \cdot 7H_2O$, and alkali sufficient to provide a pH of 8.0 fermenting the above at 25° C. under aerobic conditions for 48 hours, and then strongly acidifying to terminate the fermentation and free the desired 10-hydroxystearic acid from its soaps.

2. Method of obtaining 10-hydroxystearic acid from oleic acid comprising (a) preparing a nutrient medium having the following composition in parts by weight:

| | |
|---|---|
| Commercial yeast extract | 0.5 |
| Potassium acid phosphate (monobasic) | 0.4 |
| Magnesium sulfate heptahydrate | 0.05 |
| Distilled water | 100.0 |

(b) adding aqueous alkali to adjust the pH of the medium to 8.0,
(c) transferring aliquots of the medium to shake flasks,
(d) sterilizing the medium,
(e) inoculating the sterilized medium with cells from a pure culture of the pseudomonad NRRL B-2994,
(f) incubating the flasks at 25° C. on a rotary shaker for 24 hours,
(g) adding 0.5 part oleic acid and 0.5 part of a dilute solution of a non-ionic emulsifying agent,
(h) incubating at 25° C. for 48 hours on a rotary shaker,
(i) adding acid to provide a fermentation-terminating pH of 1.6,
(j) extracting the free fatty acids with an organic solvent,
(k) removing the solvent,
(l) fractionally crystallizing substantially pure 10-hydroxystearic acid from petroleum ether at −15° C.

No references cited.